April 10, 1951     D. S. REYNOLDS ET AL     2,548,241
BEVERAGE DISPENSING APPARATUS
Filed Sept. 2, 1948     7 Sheets-Sheet 1
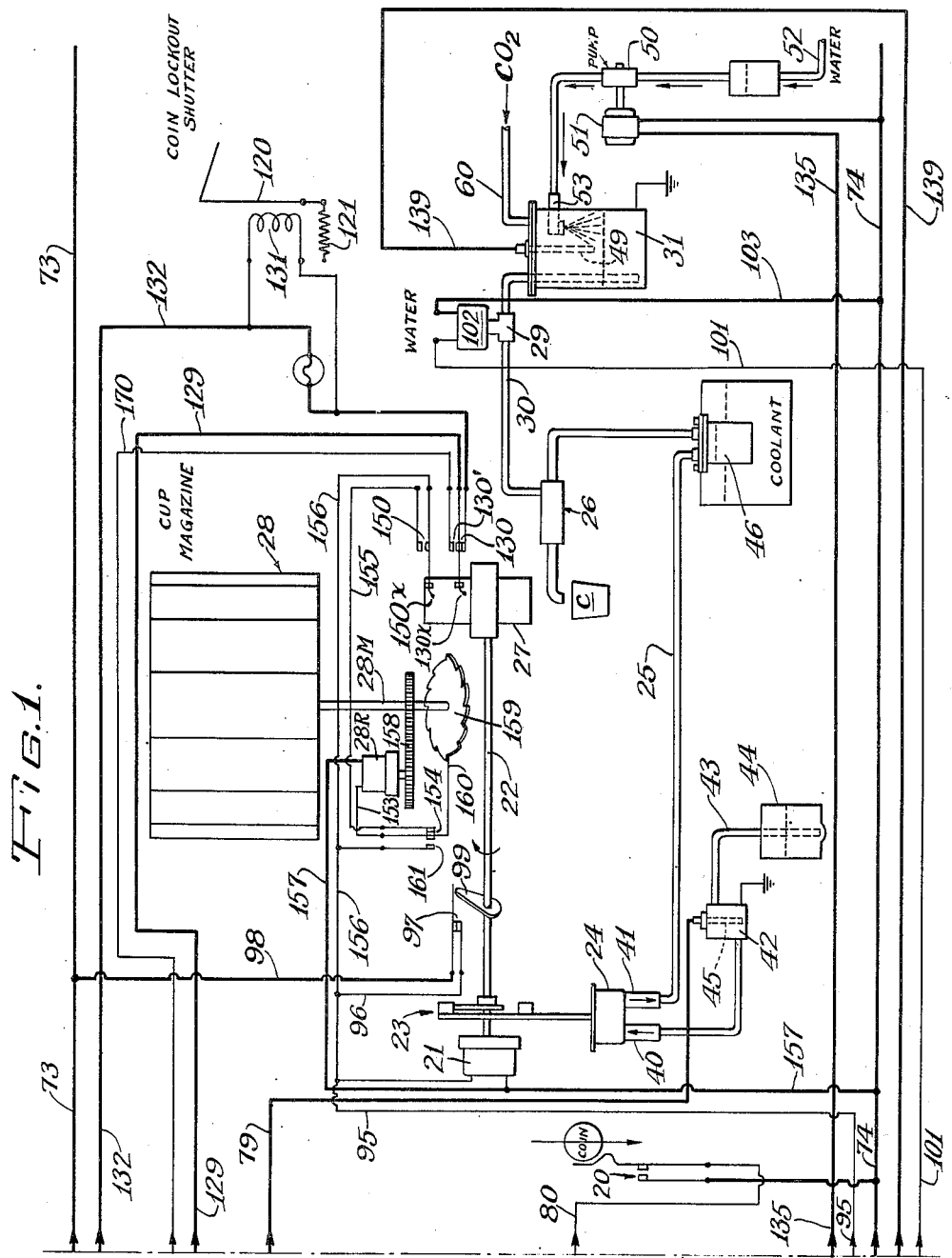
Inventors:
Donald S. Reynolds
Donald E. Hooker
Amos Voirol
By (signature)
Attorney

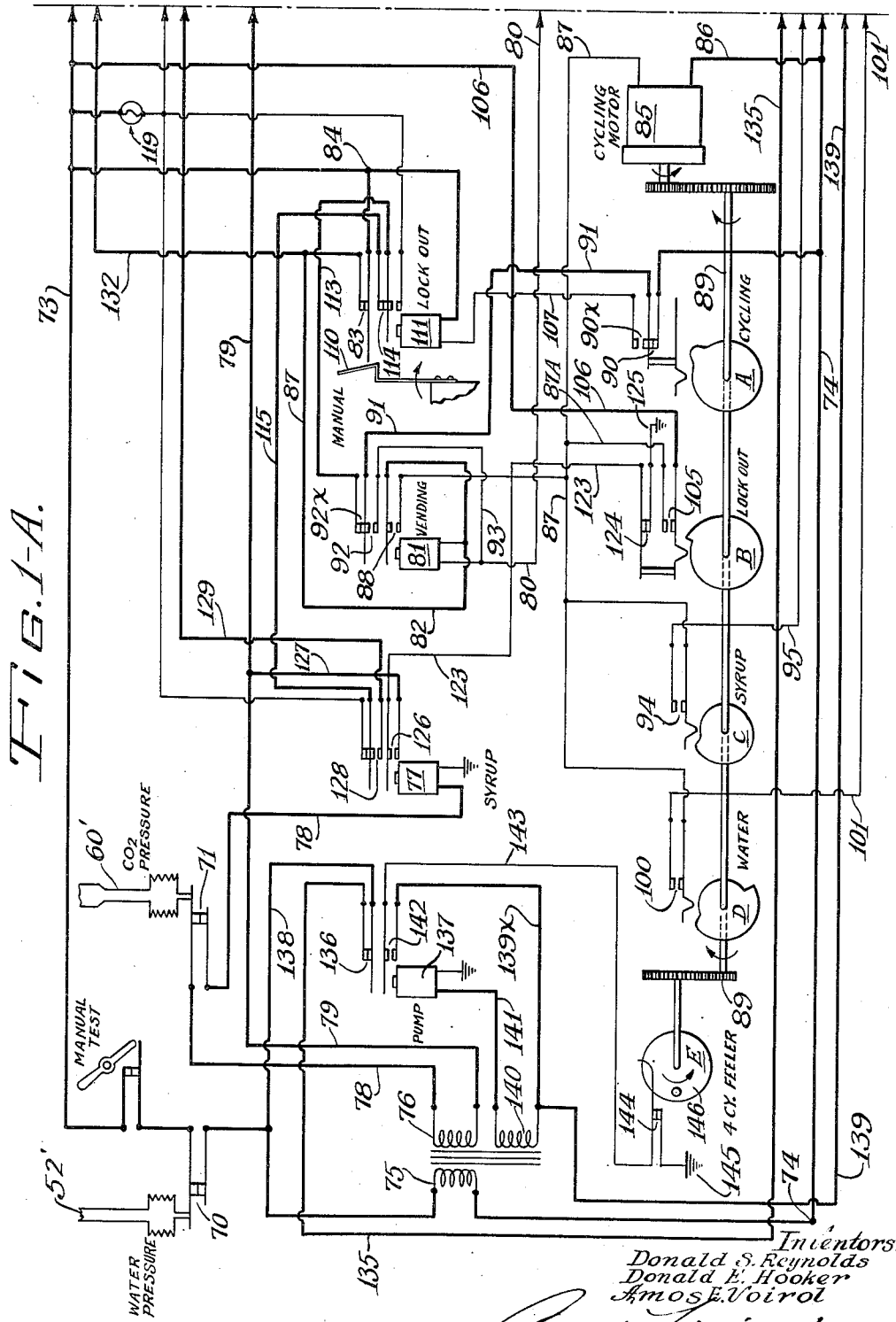

April 10, 1951     D. S. REYNOLDS ET AL     2,548,241
BEVERAGE DISPENSING APPARATUS
Filed Sept. 2, 1948     7 Sheets-Sheet 3

Inventors:
Donald S. Reynolds
Donald F. Hooker
Amos E. Voirol
By Carl Livingston
Attorney April 10, 1951  D. S. REYNOLDS ET AL  2,548,241
BEVERAGE DISPENSING APPARATUS
Filed Sept. 2, 1948  7 Sheets-Sheet 4
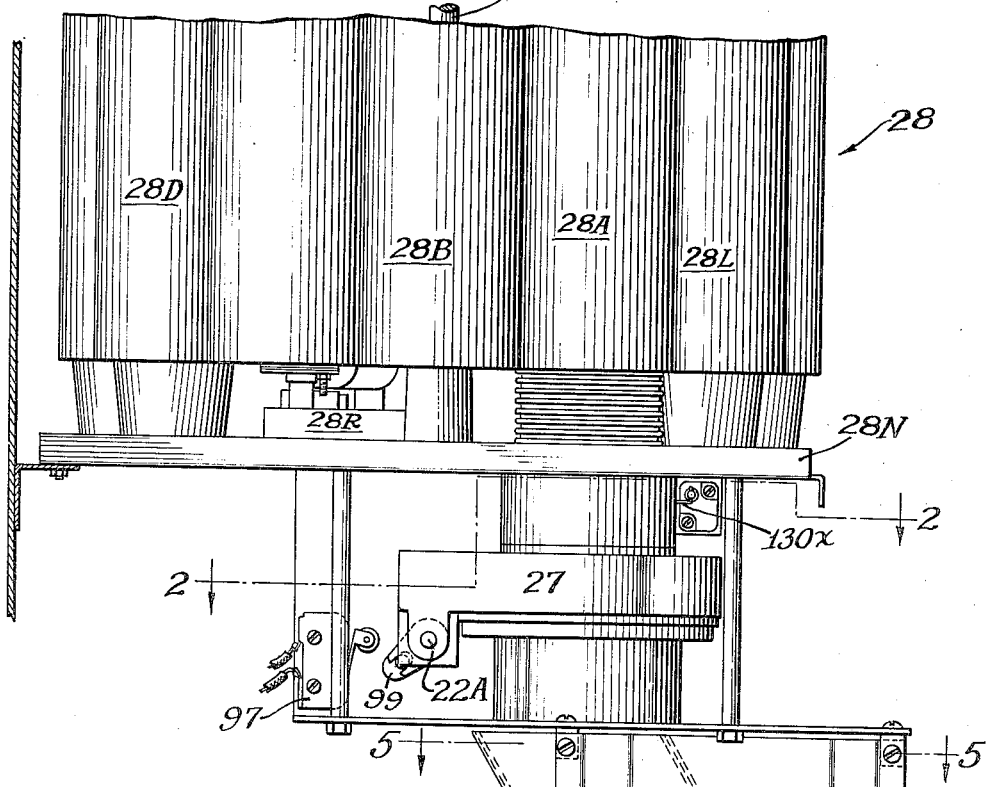
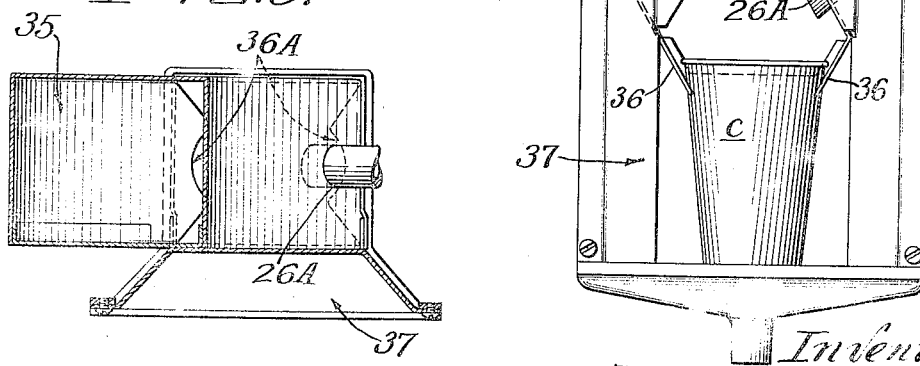
Inventors:
Donald S. Reynolds
Donald E. Hooker
Amos E. Veirol
By (signature)
Attorney April 10, 1951   D. S. REYNOLDS ET AL   2,548,241
BEVERAGE DISPENSING APPARATUS
Filed Sept. 2, 1948   7 Sheets-Sheet 5

Inventors:
Donald S. Reynolds
Donald E. Hooker
Amos E. Voirol
By Carroll Livingston
Attorney April 10, 1951  D. S. REYNOLDS ET AL  2,548,241
BEVERAGE DISPENSING APPARATUS
Filed Sept. 2, 1948  7 Sheets-Sheet 6

Inventors:
Donald S. Reynolds
Donald E. Hooker
Amos F. Voirol
By (signature)
Attorney April 10, 1951 D. S. REYNOLDS ET AL 2,548,241
BEVERAGE DISPENSING APPARATUS
Filed Sept. 2, 1948 7 Sheets-Sheet 7

Inventors
Donald S. Reynolds
Donald E. Hooker
Amos E. Voirol
By
Attorney

Patented Apr. 10, 1951

2,548,241

UNITED STATES PATENT OFFICE 2,548,241

BEVERAGE DISPENSING APPARATUS

Donald S. Reynolds, Niles, Donald E. Hooker, Skokie, and Amos E. Voirol, Oak Park, Ill., assignors, by mesne assignments, to Lyon Industries, Inc., New York, N. Y., a corporation of Delaware Application September 2, 1948, Serial No. 47,408

19 Claims. (Cl. 225—21)

1

This invention pertains to beverage dispensing apparatus, particularly the automatic and coin-operated varieties, the principal objects being the provision of cycling and control means and associated instrumentalities for performing various dispensing operations such as: replenishing the cup supply; ejecting cups; preventing operation when there are no cups; ejecting flavoring syrup and water; preventing operation when the water pressure or supply fails, and when the gas pressure fails, and when the syrup supply fails; together with other control features pertaining to indexing of a magazine-type cup storage device, as well as a no-waiting indexing means for the syrup and cup dispensing, which is effective to dispense the syrup and a cup with reduced delay when the machine is set into operation, by reason of certain coaction between a syrup measuring pump means and the cup dispensing means.

An additional object of importance is the provision of a novel control feature and means for sensing and regulating the water and syrup levels, or operations dependent thereupon, by special feeler circuits.

A further object of importance is the provision, in apparatus of the class described, of cycling and control means, and circuits therefor, for effecting both the dispensation of liquids and cups, and for sensing the extent of supply of liquids and cups at certain times with the object of replenishing said supplies from local sources from time to time, so that time delays are reduced or eliminated in delivering the drink, the reliability of the machine is improved, and economies may be effected in servicing, manufacturing and maintaining the machines.

Additional objects and aspects of novelty pertain to details of the construction and operation of the embodiment described hereinafter in view of the annexed drawings, in which:

Fig. 1 is a schematic layout and circuit diagram of certain dispensing instrumentalities and control circuits and elements therefor;

Fig. 1—A is another schematic layout and circuit diagram complementary to Fig. 1 in that it completes certain circuits not shown in Fig. 1 because of space limitation;

Fig. 4 is a fragmentary side elevation of the cup magazine and dispensing means, including the cup receiver;

Fig. 5 is a sectional detail through the cup chute and receiver looking down upon lines 5—5 of Fig. 4;

Figure 10:
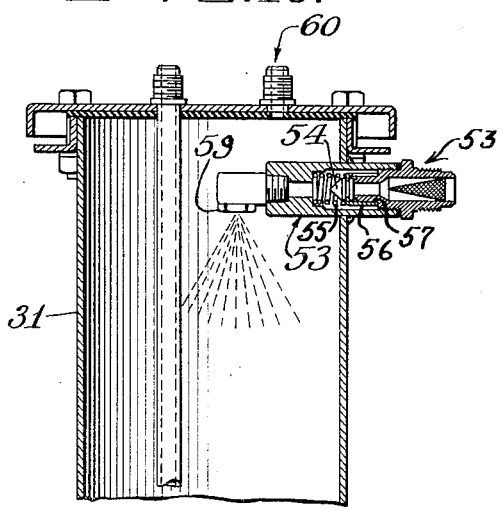
Fig. 10 is a fragmentary sectional detail of the carbonator and feeler tank showing the water-inlet booster valve in section.
Figure 10A:
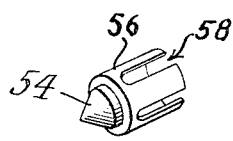
Figure 11:
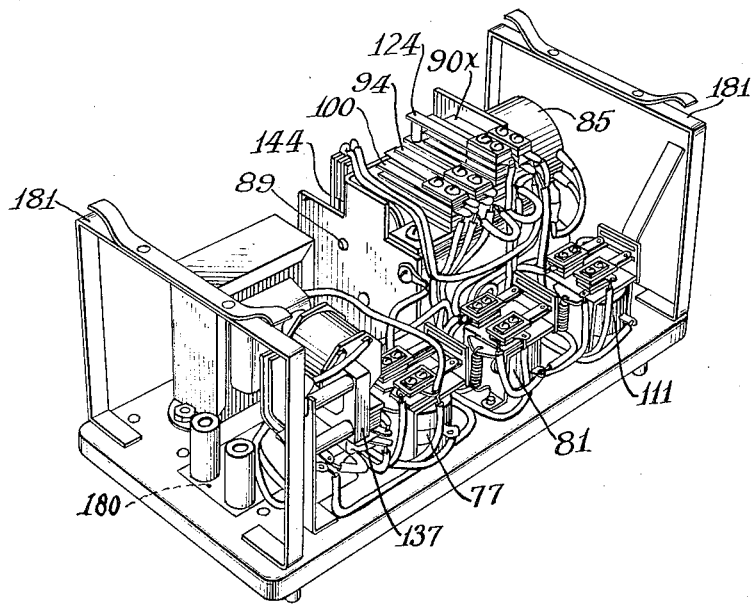
Figure 12:
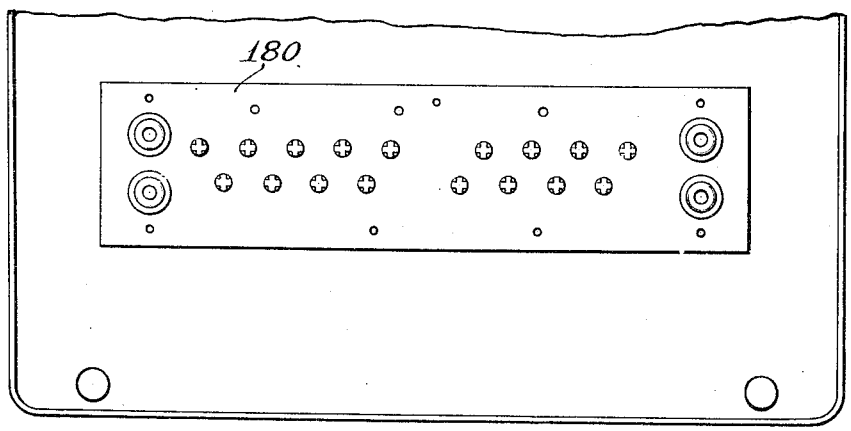

Fig. 10—A is a sectional detail of the booster valve;

Fig. 11 is a top perspective view of the cycling control unit;

Fig. 12 is a bottom plan view of the cycling control unit.

Certain important dispensing features of the invention are shown in Fig. 1, and include coin-actuated starting contacts 20, closure of which initiates a dispensing cycle through the agency of the novel cycling control unit hereinafter described in detail.

When the dispensing cycle is started as aforesaid, a pump motor 21, through shaft 22 and cam means 23, actuates a syrup-measuring pump 24 to eject a certain volume of flavoring syrup under pressure via tube 25 to the spigot 26, it being noted that a cup C, theretofore ejected at the start of the cycle by conventional cup dispensing means 27, is in position to receive the charge of syrup. The measuring pump and the cup dispenser are actuated from the same shaft 22, and a rotary cup magazine 28 feeds stacks of cups successively into the dispenser unit 27.

Following the start of the syrup-ejecting operation as aforesaid, a water valve 29 is actuated by the cycling means to open water line 30 to spigot 26, permitting a certain volume of carbonated water to be delivered to the cup C from a carbonating and level control tank 31.

The cycling of the measuring pump is such that the latter completes each dispensing cycle about two-thirds full of syrup, so that at the beginning of each cycle, said pump has only to complete about one-third of an intake stroke before starting its discharge stroke. In one form of the invention, it is desirable to have the water start its discharge from the spigot before the syrup is completely measured out and ejected, so that there is some intermixing and so that there will be some water following to wash the spigot of syrup for hygienic reasons; or if desired, the syrup and water may issue together by using spigot means such as disclosed in the copending application Serial No. 37,288 of Donald Reynolds, in which case the cycling cams C and D of the cycling unit herein would be correspondingly adjusted.

Figure 6:
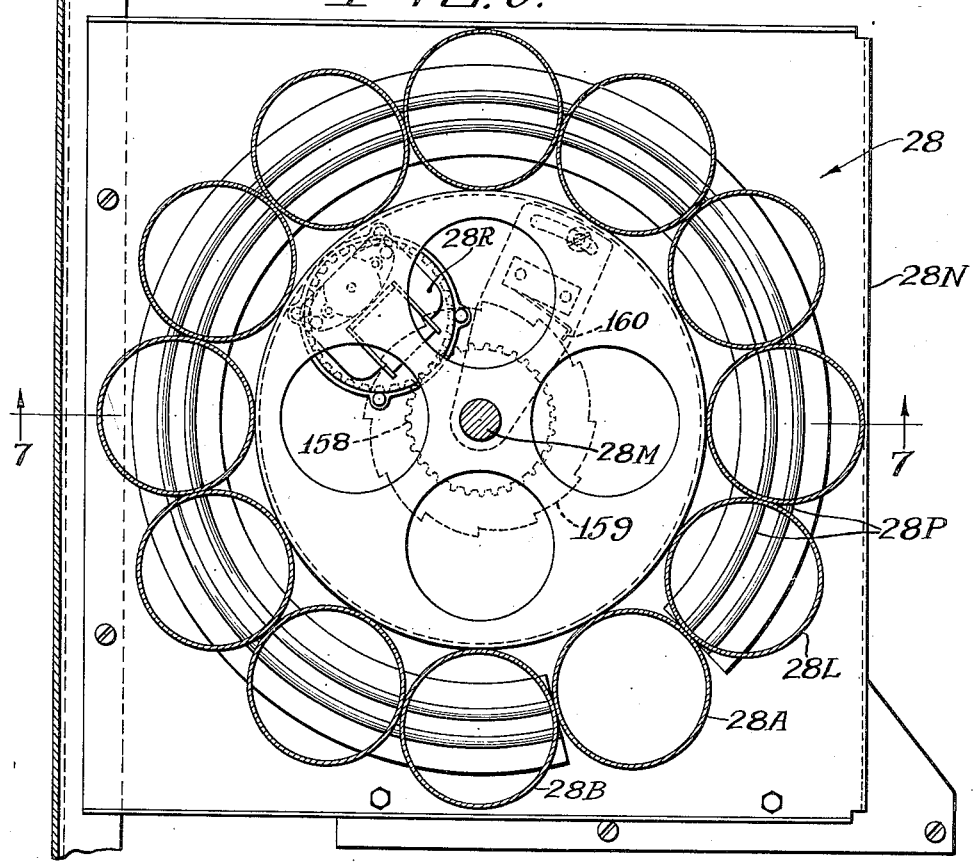
Fig. 6 is a horizontal section through the cup magazine turret.
Figure 7:
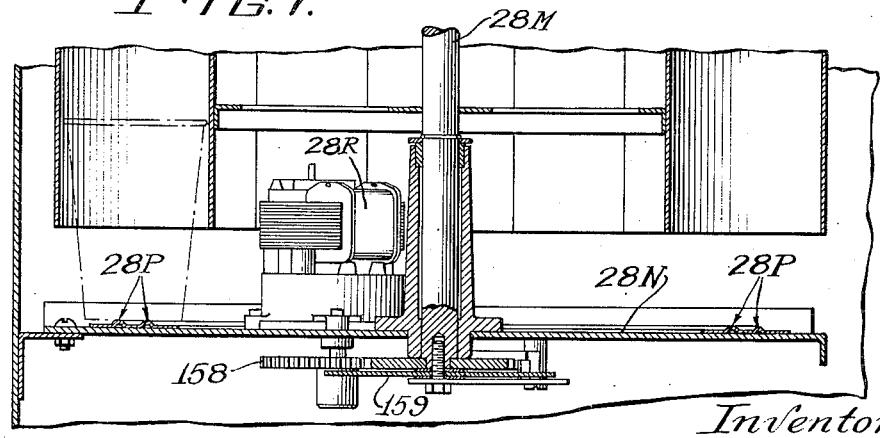
Fig. 7 is a vertical section through the cup magazine turret looking in the direction of lines 7—7 of Fig. 6.

The magazine cup-dispensing means, as viewed in Fig. 4, includes the magazine turret 28 with a plurality of tubular cup magazines 28A, 28B... 28L, and having open bottoms and tops, arranged about a central shaft 28M (Fig. 6 also) to rotate above a shelf 28N through urgence of a motor 28R. Each of the tubular magazines is filled with a stack of paper cups, as illustrated for the magazine 28A in Fig. 4, which ultimately will be in alignment with the cup dispenser unit 27 to gravitate into the latter; the cups in the other magazine tubes, as at 28D, ride on raised tracks 28P (Fig. 6) on the shelf until ultimately brought into alignment with the dispenser unit as each magazine is emptied, the control means for effecting this operation of the turret by the motor 28R being described elsewhere herein.

Cups ejected by the dispenser 27, Fig. 4, gravitate down a chute 35 to lodge between a pair of holders 36 (Fig. 5 also) having arcuate grippers 36A into which the upper peripheral portions of the paper cup fit and become slightly squeezed, when the cup C fills, so that the customer, in reaching into the cup rest 37 must exert a slight effort to free the filled cup from the grippers, which otherwise serve to secure the cup C in position while it is being filled, and to prevent bouncing of the cup from proper position on the rest as it drops into position. The discharge end 26A of the dispensing spigot is positioned just above the grippers and cup C, Figs. 4 and 5, it being understood of course that the entire beverage dispensing apparatus described herein is to be housed in a suitable cabinet (not shown) in which the cup rest 37 is fixed for access by the customer.

Figure 2:
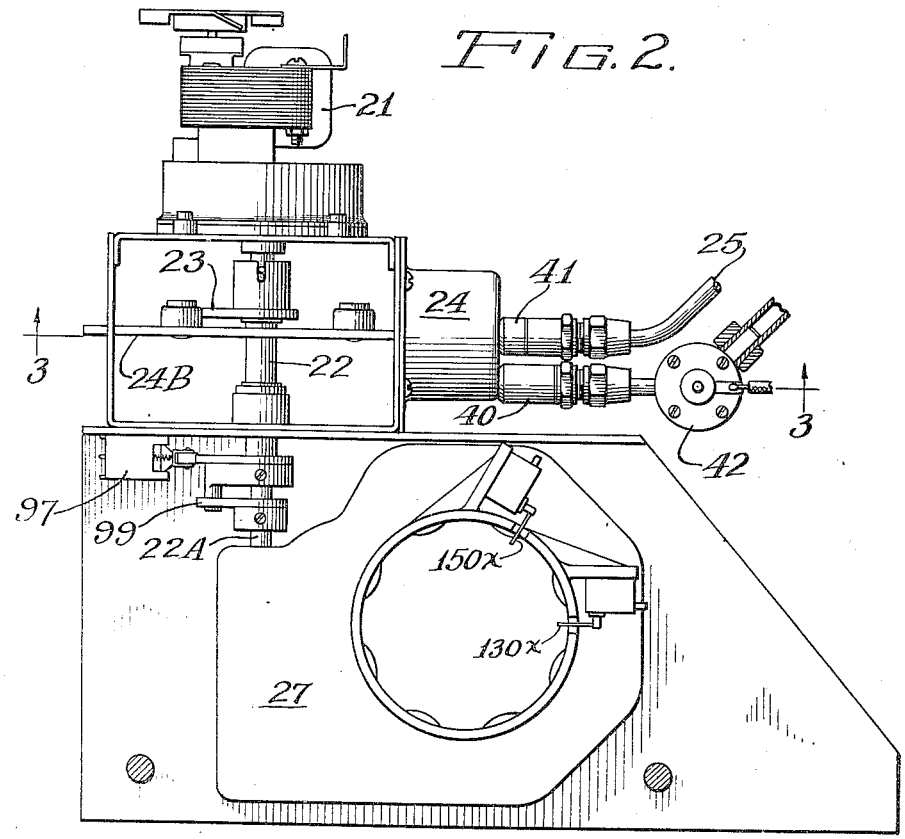
Fig. 2 is a top plan view of the measuring pump and cup dispensing unit; it is taken along lines 2—2 of Fig. 4.

The syrup measuring means coacts with the cup dispensing means through the structure shown particularly in Fig. 2, wherein the dispensing motor 21, driving shaft 22 with its extension 22A into the cup dispenser unit 27, actuates the latter by a single revolution of said shaft portions 22 and 22A, and also actuates the syrup measuring pump 24 during the same revolution. The cup dispenser 27 is of a variety well-known in the art and does not per se constitute part of the invention, excepting in so far as any cup dispenser capable of a cup-ejecting operation responsive to one revolution of a shaft 22A, combined to coact with measuring pump means 24, which also completes its operation in one revolution, is considered a feature of novelty and subject to patentable claim, alone or in combination with other features hereinafter described.

Figure 3:
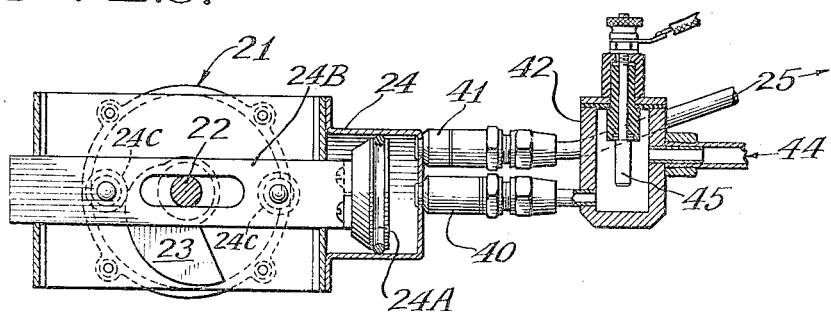
Fig. 3 is a vertical sectional detail taken along lines 3—3 of Fig. 2, showing the measuring pump and syrup feeler device.

The volumetric displacement of the pump 24 is chosen to represent the desired charge of flavoring syrup necessary for mixing the drink to be dispensed; and as shown especially in Fig. 3, this pump includes piston 24A reciprocated by bracket 24B provided with cam rollers 24C engaged by cam means 23 on shaft 22 rotated by motor 21. The cylinder of this pump connects through intake check valve means 40 and discharges through outlet check valve means 41 into line 25 (as in Fig. 1).

An important feature of the syrup dispensing means is the feeler control which includes a small reservoir or fount 42 (Figs. 1 and 3) communicating with the inlet check valve 40 and a syrup supply tube 43 from tank 44. This fount or well is metallic, sealed, and includes an insulated electrode 45, connecting with the well in a feeler circuit to be described, the function of which is to determine electrically, by electroconductivity through the syrup liquid, the presence or absence of syrup in the fount and to permit or prevent the operation of the machine accordingly.

An important aspect of the invention is the control of the feeler circuits and the main operating circuits and apparatus in particulars to appear hereinafter.

Figure 8:
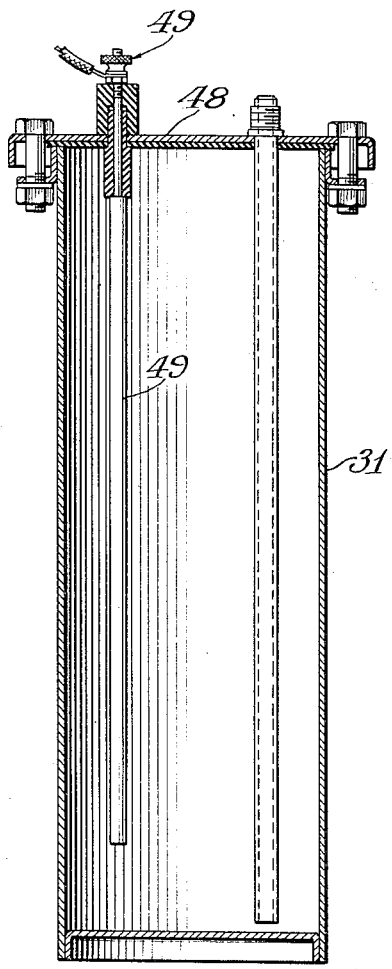
Fig. 8 is a vertical section through the carbonator tank and water feeler device.
Figure 9:
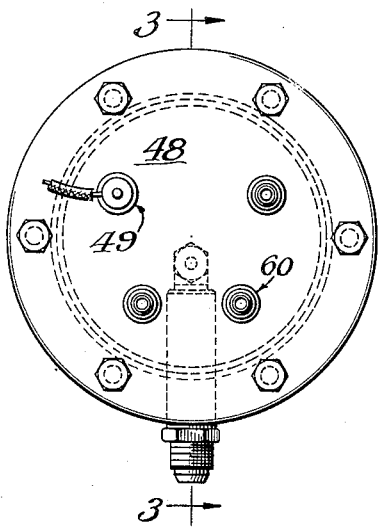
Fig. 9 is a top plan view of the carbonator and feeler tank.

Another important feeler circuit is provided for the carbonated water, and includes the metallic tank 31 shown in Fig. 8 (also in Fig. 1) with a sealed pressure-proof top 48 and an insulated electrode 49 therein and connecting with the feeler circuit means hereinafter described, the purpose of which is to set up a supervisory circuit through the water, tank 31 and electrode 49 every fourth vending cycle such, that if the water in tank 31 is too low, a water pump 50 (Fig. 1) driven by motor 51, will force water from supply line 52 into said tank through a special booster spray valve 53 (Fig. 10), which includes a valve head 54 of rubber or the like normally seated by spring 55. The valve head is fitted into the perforate end of a metal booster shell 56, as in Fig. 10—A, which slides on neck 57 of the insert nipple. Booster slots 58 in the side walls of the shell are normally closed off from communication with the pressure inside tank 31 when the valve is closed; however, as soon as the valve head 31 has moved slightly and enough to expose the base portions of these booster slots, the pressure within the tank is exerted against the interior of said shell, thereby assisting in the opening of the spray valve, the nozzle 59 of which sprays the pumped water into the gaseous atmosphere existing therein by reason of the connection 60 with a supply of carbon dioxide gas, under considerable pressure.

*Cycling circuit and control unit*

Considering Figs. 1 and 1—A together, and assuming that proper water pressure and gas pressure exists in the supply lines 52 and 60, the associated pressure switches 70 and 71 (on water and gas line bellows 52′ and 60′, respectively, Fig. 1—A) are closed. A manual safety test switch 72, in series with water switch 70 is also normally closed, so that power line conductors 73 and 74 are in closed circuit with the power transformer primary 75.

The power line conductors and normally energized or hot branches thereof, in certain cases, are indicated in heavy lines.

Under the foregoing conditions, the power transformer secondary 76 (Fig. 1—A initially energizes the syrup feeler relay 77 via conductors 78 and 79 and feeler electrode 45 (Fig. 1), and well 42 to ground, assuming that syrup is in said well for electrolytic conduction. However, as hereinafter more fully described, continual electrolytic conduction is eliminated by provision of by-pass feeler contacts 126 on the syrup relay 77 in series with feeler contacts 124 on cam switch B, the latter acting on each dispensing cycle to open said by-pass circuit momentarily to feel the presence of syrup sufficient for one drink.

Assuming now that the patron inserts the required coin to close coin switch 20 (Fig. 1) a power circuit is closed from conductor 74, conductor 80 to the vending relay coil 81, and conductor 82, normally closed lockout contacts 83, and connection 84 to the other power line 73, thereby causing the vending relay to pull up.

As a result of energization of the vending relay 81, the cycling motor 85 (Fig. 1—A) is energized via conductors 86, 87, vending relay contacts 88, conductor 82, lockout contacts 83 and power line connection 84, thus starting rotation of the cycling shaft 89; and at this time a cycling circuit is locked-in for said motor form power line 74 by closed (cam A) contacts 90, conductor 91, now closed contacts 92 on the vending relay, and conductor 93 to relay coil 81.

Substantially at the beginning of the aforesaid cycle, the cycling cam C closes cam switch contacts 94, thereby applying power from line 87 (now locked into the power circuit) and conductors 95, 96, closed pump cam switch contacts 97, and connection 98 from power line 73, to energize the syrup pump motor 21 for one operating cycle, determined by rotation of its cycling cam 99, thereby causing syrup measuring pump 24 to complete its intake and exhaust stroke to eject a measured amount of syrup from spigot 26.

Concurrently with the aforesaid operation of the measuring pump, shaft 22 is rotated to cause ejection of a cup C by the cup dispenser 27.

It is important to note that rotation of the shaft 22 is arrested after one revolution by cam switch means 97—99 at a carefully fixed time such that when the shaft 22 stops, the dispensing action of unit 27 is approaching completion of ejection of the next following cup; and, likewise, the piston 24A of the syrup measuring pump (Fig. 3) at this time will have completed approximately two-thirds of an intake stroke after having ejected the required measure of syrup, with the result that there is a minimized delay or wait on the part of the customer, following his insertion of a coin, before the drink begins to issue from the spigot.

Continuing with the aforesaid cycle of operation, substantially at the time the syrup dispensing action is begun, the cycling cam D closes cam switch contacts 100, thereby applying power from locked-in power connection 87, conductor 101, water valve solenoid coil 102, and conductor 103 to power line 74, with the result that the water valve 29 is opened as the syrup is delivered to the mixing spigot 26, the water and syrup intermixing and discharging into the now waiting cup C.

In a normal cycle of operation, the delivery of the drink is now completed, and the cycling cam A will approach completion of its cycle to release the vending relay 81 and stop the cycling motor. And at this juncture, a safety supervisory feature is introduced to prevent repeated delivery of drinks due to fraud or a jammed coin switch.

Just prior to opening of the cycling contacts 90 by cam A, lockout contacts 105 are closed by cam B to set up a hold-over circuit for the vending relay and motor 85 via conductor 87A, said contacts 105, conductor 106, power lead 73, with vending relay 81 still holding at contacts 88.

If, at this time (the end of the cycle), the coin switch 20 should be jammed or fraudulently operated, it is apparent that the vending relay would not release but would be held for another cycle.

However, the cycling circuit is held momentarily by contacts 105, such that if the coin switch conductor 80 at this time is hot, the lockout relay coil 111 will be energized via contacts 90X on the cycling switch, at the end of the cycle, conductor 107, conductor 91, closed contacts 92, conductor 93, coin switch lead 80, whereupon the power connection from line 73, at 84, will be broken by opening of lockout relay contacts 83 (conductor 82, vending relay contacts 88, lead 87 to motor 85 and also relay 81), thus dropping out the vending relay 81 and stopping the cycling motor 85.

When the aforesaid situation arises, resulting in an operation of the lockout relay, the latter become mechanically locked by spring lever 110, and the machine cannot again be operated until manually restored by the service man or proprietor, since its contacts 83 must be normally closed as a condition precedent to such operation.

Should the syrup supply become exhausted, the empty light 119, Fig. 1—A, would become illuminated, and a coin blocking device 120, Fig. 1, would be operated by its spring 121 because its hold-in coil 122 would become de-energized responsive to dropping out of the syrup relay 77.

As previously mentioned, the syrup relay 77 becomes energized as soon as power is applied to the machine, assuming of course that there is syrup in the fount 44 and sump or feeler well 42, the circuit for this extending from secondary conductor 78 to coil 77, the remaining terminal of which is grounded, while the remaining terminal of the secondary extends via conductor 79 to feeler electrode 45, Fig. 1, tank 42 being grounded, so that there is conductivity to ground through the syrup, and relay 77 pulls up.

*Syrup level test*

As soon as the syrup relay pulls up, it locks a by-pass circuit around the feeler electrode 45 via conductor 123, closed cam B contacts 124 to ground 125, and syrup relay contacts 126, conductor 127 to the electrode.

At the end of each dispensing cycle, cam B opens contacts 124 momentarily, thus placing the feeler electrode in the relay circuit, so that if there is no syrup, relay 77 drops out, opening its contacts 128, which connect power from conductor 74. Cam switch A contacts 90, conductor 91, vending relay contacts 92, 92X, lockout relay contacts 114, conductor 115, said contacts 128, conductor 129 through the normally closed cup feeler contacts 130, through the hold-in coil 131 for the coin-blocking device, and via conductor 132, through lockout relay contacts 83 to junction 84 with the power line 73; thus, dropping out of the syrup relay 77 due to lack of syrup, opens contacts 128 and deenergizes the coin blocking hold-in coil 131 so that a coin blocking shutter 120 is moved by spring 121 into position to block coins from actuating the coin switch 20.

In accordance with the foregoing devices, the syrup supply or level is sensed or felt during each drink cycle, although the testing circuit is set up (through relay 77) all the while the machine is in operation, this testing circuit, however, being by-passed or shunted by cam switch contacts 124 at all times except for a brief testing or feeling interval during each cycle, whereby heating of the syrup and electrolysis is eliminated during the standby or idle intervals.

Water level test

Normally, the water level in the carbonating tank 31 is established by action of pump 51 energized from power line 74, conductor 135, contacts 136 on the pump relay 137, conductor 138 connecting to the other power line 73 through water switch 70.

When the water reaches the electrode 49, the circuit from ground through tank 31 is completed for relay 137 via conductor 139, secondary transformer winding 140, conductor 141 through the coil of relay 137 to ground to cause said relay to pull up and thereby establish a by-pass or hold-in circuit at its contacts 142 from power lead 139X via conductor 143, feeler cam switch contacts 144 to ground at 145.

Thus, when the water level is brought up, the pump relay 137 pulls up and locks a holding or by-passing circuit through the feeler contacts 144. Cam means 146 is geared to the cycling shaft 89 so that during every fourth drink dispensing cycle, feeler contacts 144 are opened; if the water level is high enough (at least to electrode 49) a momentary hold-over circuit is afforded thereby through electrode 49, and relay 137 does not drop out; but if the water level is below said electrode, relay 137 drops out and its contacts 136 close and start the pump until the level is restored. Thus, the water supply is sensed or felt only every fourth cycle, and electrolysis during the off-cycle or idle time is eliminated.

Cup supply feelers

As heretofore mentioned, the magazines 28 are filled with stacks of paper cups with one magazine tube in alignment with the cup dispenser 27 to permit its stack of cups to gravitate into the latter, in which condition of things, the upper cup feeler switch 150 will be open, as will also the upper set of contacts 151X of the lower cup feeler switch, the lower pair of contacts 130 of the latter (lower) switch being at this time closed, so that the energizing circuit through the coin blocking shutter coil 131 is closed and the coin-blocking arm 120 will be withdrawn to permit deposit of coins.

When the level of cups in the dispenser 27 falls below the first cup-level feeler 150X, cup-feeler switch 150 closes, thereby starting the magazine motor 28R by a circuit from the latter via conductor 153, index contacts 154, conductor 155 through said feeler contacts 150, conductor 156 and 96 through the pump cam switch 97, conductor 98 to power line 73, and power connection 157 from the magazine motor to the other power line 74.

Thus, the magazine motor 28R will through its gear connection 158 cause rotation of the magazine turret about shaft 28M a distance sufficient to bring the next cup magazine into register with the dispenser 27, this action being controlled by the indexing gear 159 and index feeler 160, there being a take-over index contact 161 engaged by one of the index contacts 154 in circuit with cup feeler switch 150 to hold said magazine motor circuit while the turret is moving to next position. As soon as a supply of cups drops into the dispenser to open upper feeler switch 150, the turret motor circuit is broken; should no cups emerge from the next magazine, the turret would continue to move to the next magazine during the next dispensing cycle of the machine, i. e., when the dispensing shaft switch 97—99 closed again, it being important to observe that a distance equivalent to some eight or ten cups exists between the upper cup feeler switch 150 and the lower switch 130, so that the turret will advance one magazine for each dispensing cycle so long as the cup level is below the upper feeler switch 150.

In the event that all of the magazine tubes are empty and the cup level has fallen below the upper feeler means, and then drops below the lower feeler means 130—130X, contacts 130 will open, thus de-energizing the coin blocking device 131—120 as so that the empty light 119 would be lighted and the patron would be prevented from depositing any more coins in the machine. The empty light is held on by contacts 130', conductor 170 to empty light 119 (Fig. 1—A).

The cycling control mechanism (excepting only the water and gas pressure switches and manual test switch and empty light) is contrived as a compact subassembly unit depicted in Fig. 11, wherein certain of the circuit components are identified by reference character. This cycling control unit is provided with bottom plug-in contacts 180, Fig. 12, such that by grasping the frame handles 181, Fig. 11, the unit may be inserted and withdrawn from operating condition and connection with other cooperating components for servicing and the like.

The invention claimed is:

1. In a beverage dispensing system, the combination with a liquid supply, of level control means comprising an electrolytic feeler circuit for said supply and including a control relay closed through said circuit when there is a predetermined amount of said liquid in the supply, a standby circuit shunting out electrolytic current flow, and cycling switch means opening said standby circuit at predetermined intervals for operation of said relay by electrolytic current flow if the liquid supply affords said predetermined amount, said relay opening and dropping out if said predetermined amount is not available.

2. A beverage dispensing system as claimed in claim 1 wherein said cycling switch means includes a normally closed switch in said standby circuit, a cycling motor, a cam operated by said cycling motor and opening said normally closed switch in said standby circuit.

3. A beverage dispensing system as claimed in claim 1 wherein said cycling switch means includes a normally closed switch in said standby circuit, a cycling motor, a cam operated by said cycling motor and opening said normally closed switch in said standby circuit, and a pressure actuated switch in said electrolytic "feeler" circuit and operable under predetermined pressure differences to make or break said electrolytic "feeler" circuit.

4. A beverage dispensing system as claimed in claim 1 including a coin-controlled switch controlling making and breaking of said electrolytic feeler circuit, a lock-out shutter for preventing operation of said coin-controlled switch, and switch means operated by said control relay for rendering said lock-out shutter effective to prevent energizing of the feeler circuit.

5. A beverage dispensing system as claimed in claim 1 wherein said cycling switch means includes a normally closed switch in said standby circuit, a cycling motor, a cam operated by said cycling motor and opening said normally closed switch in said standby circuit, a coin-controlled switch controlling energizing of said electrolytic feeler circuit, a lock-out shutter for preventing operation of said coin-controlled switch, and switch means operated by said control relay for rendering said lock-out shutter effective to prevent energization of the feeler circuit.

6. A beverage dispensing system as claimed in claim 1 wherein said cycling switch means includes a normally closed switch in said standby circuit, a cycling motor, a cam operated by said cycling motor and opening said normally closed switch in said standby circuit, a coin-controlled switch controlling energizing of said electrolytic feeler circuit, a lock-out shutter for preventing operation of said coin-controlled switch, switch means operated by said control relay for rendering said lock-out shutter effective to prevent energization of the feeler circuit, and a pressure actuated switch in said electrolytic feeler circuit and operable under predetermined pressure differences to make or break the electrolytic feeler circuit.

7. In a liquid dispensing system, the combination with a liquid supply of an electrolytic feeler circuit closed by said liquid, a relay in said circuit and initially operated by electrolytic current flow therein, a standby circuit closed by said relay when operated as aforesaid to by-pass the electrolytic current and eliminate electrolytic current flow after said relay is operated as aforesaid, and switch means in said standby circuit and operating at predetermined intervals to open said standby circuit to cause said relay to drop out if the supply of liquid is less than a certain amount, so that there is no electrolytic current flow.

8. In a beverage dispensing system, the combination with liquid dispensing means of a cycling circuit and instrumentalities operating to dispense one volume of liquid per cycle, a feeler circuit closed electrolytically through a supply of said liquid in an initial feeling operation, a by-pass holding circuit shunting out said electrolytic circuit provided there is an initial electrolytic current flow in said initial feeling operation, switch means in said cycling circuit and operated near the end of each cycle for opening said by-pass circuit to test for electrolytic current flow, and means for preventing actuation of said system if there is no test current flow as aforesaid.

9. In a liquid dispensing system, a dispensing control circuit, a feeler circuit completed electrolytically through the liquid to be dispensed, and switch means in said feeler circuit and normally opening the same to prevent electrolytic current flow, and means coacting with said dispensing control circuit for closing said last-mentioned switch means only at predetermined intervals to test-feel for the presence of liquid to be dispensed.

10. In a rotary-turret magazine cup dispenser having a magazine rotating motor and a cup dispenser unit, improvements comprising index switch means in circuit with said motor to stop the same with a magazine aligned with said dispenser unit, an upper cup feeler switch in said unit and in circuit with said motor to start the latter whenever the cup supply level in said unit drops below said feeler switch, a cycling circuit for said dispenser unit to effect dispensation of one cup per cycle, connections between the cycling circuit and said motor such that the latter can run only during the operating cycle for said cycling circuit, and a lower cup feeler switch in said dispensing unit together with electromechanical means actuated thereby when the cup supply level drops below said lower switch for preventing initiation of said operating cycle.

11. In a beverage dispenser, a cycling circuit therefor, switch means for initiating an operating cycle, a cup dispenser operably controlled through said cycling circuit to dispense one cup per cycle, a magazine of cups, a motor driving said magazine, index switch means for said motor to align a cup magazine with said cup dispenser, connection between said index switch means and cycling circuit permitting operation of said motor only during an operating cycle, an upper feeler switch for said cup dispenser connected to start said motor when the cup supply reaches a certain level in said cup dispenser, and a second feeler switch for said cup dispenser and electromagnetic means actuated thereby for preventing operation of said first switch means for initiating an operating cycle when the cup supply is below another level.

12. Beverage dispensing apparatus comprising a first cycle switch means and a driving motor therefor, a coin-controlled starting switch for said motor to start an operating cycle therefor, an electrolytic beverage-liquid supply feeler circuit operated by said cycle switch means at intervals of a predetermined number of cycles, a liquid measuring pump and cup dispenser coacting for cyclic operation to dispense one cup and one volume of liquid, a dispenser motor driving said pump and cup dispenser, a second cycling switch for said dispenser motor and connected for cooperation with said cycling switch means to effectuate one dispensing cycle during each operating cycle of said first cycle switch means, a cup magazine and automatic index means therefor, a magazine motor connected for energization under control of said second cycling switch means and a cup-operated switch such that said magazine motor will continue to be energized, and said magazine automatically indexed, every operating cycle until cups are delivered by said magazine to actuate said cup-operated switch.

13. Apparatus as defined in claim 12 and further characterized by the provision of a second cup switch associated with said cup dispenser and electromagnetic means controlled thereby to prevent operation of said coin switch when the cup supply falls below a certain level and said magazine fails to deliver cups.

14. Apparatus as defined in claim 12 and further characterized by the provision of a lock-out circuit connected to control said cycle switch motor and break the operating circuit therefor when said coin switch is in operated condition toward the end of any said operating cycle.

15. In a beverage dispenser, a cup magazine, a cup dispenser, fluid measuring and dispensing means including a fluid pump, a dispensing motor, a shaft rotated by said dispensing motor, a cam actuated by said shaft and connected to the pump for operating the pump to complete measuring and dispensing of a predetermined quantity of fluid on one revolution of said shaft, and means operated by said shaft for completing a cup ejecting operation of said cup dispenser in one revolution of the shaft, a motor for moving said cup magazine into position to deposit cups in said cup dispenser, a cup switch in the electrical circuit to said magazine moving motor, a feeler carried by said cup dispenser and engaging said cup switch to actuate the cup switch to close the energizing circuit through the magazine moving motor.

16. In a beverage dispenser, a cup magazine, a cup dispenser, fluid measuring and dispensing means including a fluid pump, a dispensing motor, a shaft rotated by said dispensing motor, a cam actuated by said shaft and connected to the pump for operating the pump to complete measuring and dispensing of a predetermined quantity of fluid on one revolution of said shaft, means operated by said shaft for completing a cup ejecting operation of said cup dispenser in one revolution of the shaft, a switch controlling electrical energization of said dispensing motor, and a cam on said shaft for operating said switch and de-energizing said dispensing motor after the shaft has made one revolution, a motor for moving said cup magazine into position to deposit cups in said cup dispenser, a cup switch in the electrical circuit to said magazine moving motor, a feeler carried by said cup dispenser and engaging said cup switch to actuate the cup switch to close the energizing circuit through the magazine moving motor, said first switch being connected in the circuit to said magazine operating motor whereby the magazine operating motor cannot be energized when the first switch is open.

17. In a beverage dispenser, a cup magazine, a cup dispenser, fluid measuring and dispensing means including a fluid pump, a dispensing motor, a shaft rotated by said dispensing motor, a cam actuated by said shaft and connected to the pump for operating the pump to complete measuring and dispensing of a predetermined quantity of fluid on one revolution of said shaft, means operated by said shaft for completing a cup ejecting operation of said cup dispenser in one revolution of the shaft, a motor for moving said cup magazine into position to deposit cups in said cup dispenser, a cup switch in the electrical circuit to said magazine moving motor, a feeler carried by said cup dispenser and engaging said cup switch to actuate the cup switch to close the energizing circuit through the magazine moving motor, an indexing gear operated by said magazine moving motor, and means actuated by said indexing gear to break the energizing circuit to said magazine moving motor when the magazine has moved a predetermined distance.

18. In a beverage dispenser, a cup magazine, a cup dispenser, fluid measuring and dispensing means including a fluid pump, a dispensing motor, a shaft rotated by said dispensing motor, a cam actuated by said shaft and connected to the pump for operating the pump to complete measuring and dispensing of a predetermined quantity of fluid on one revolution of said shaft, means operated by said shaft for completing a cup ejecting operation of said cup dispenser in one revolution of the shaft, a motor for moving said cup magazine into position to deposit cups in said cup dispenser, a cup switch in the electrical circuit to said magazine moving motor, an indexing gear operated by said magazine moving motor, and means actuated by said indexing gear to break the energizing circuit to said magazine moving motor when the magazine has moved a predetermined distance.

19. In a beverage dispenser, a cup magazine, a cup dispenser, fluid measuring and dispensing means including a fluid pump, a dispensing motor, a shaft rotated by said dispensing motor, a cam actuated by said shaft and connected to the pump for operating the pump to complete measuring and dispensing of a predetermined quantity of fluid on one revolution of said shaft, means operated by said shaft for completing a cup ejecting operation of said cup dispenser in one revolution of the shaft, a switch controlling electrical energization of said dispensing motor, a cam on said shaft for operating said switch and deenergizing said dispensing motor after the shaft has made one revolution, a motor for moving said cup magazine into position to deposit cups in said cup dispenser, a cup switch in the electrical circuit to said magazine moving motor, a feeler carried by said cup dispenser and engaging said cup switch to actuate the cup switch to close the energizing circuit through the magazine moving motor, said first switch being connected in the circuit to said magazine operating motor whereby the magazine operating motor cannot be energized when the first switch is open, a second cup switch associated with said cup dispenser, and electromagnetic means controlled by said second cup switch to prevent operation of said dispensing motor when the cup supply falls below a predetermined level and said magazine fails to deliver cups to said cup dispenser.

DONALD S. REYNOLDS.
DONALD E. HOOKER.
AMOS E. VOIROL.

REFERENCES CITED

The following references are of record in the file of this patent:

UNITED STATES PATENTS

| Number | Name | Date |
|---|---|---|
| 1,854,317 | Teesdale et al. | Apr. 19, 1932 |
| 1,882,812 | Gunn | Oct. 18, 1932 |
| 1,979,127 | Warrick | Oct. 30, 1934 |
| 2,105,339 | Sweitzer | Jan. 11, 1938 |
| 2,391,003 | Bowman | Dec. 18, 1945 |